United States Patent

Asano et al.

[11] Patent Number: 4,617,213
[45] Date of Patent: Oct. 14, 1986

[54] HYDRAULIC BRAKE HOSE

[75] Inventors: Tetsuji Asano, Inazawa; Keiichi Kodama, Nagoya; Terumitsu Shigeki, Nishikasugai, all of Japan

[73] Assignee: Toyoda Gosei Co., Ltd., Nishikasugai, Japan

[21] Appl. No.: 721,393

[22] Filed: Apr. 9, 1985

[30] Foreign Application Priority Data

Apr. 14, 1984 [JP] Japan ................................ 59-75644
Jun. 30, 1984 [JP] Japan ............................... 59-136393

[51] Int. Cl.⁴ .......................... F16L 9/00; F16L 11/00
[52] U.S. Cl. ..................................... 428/36; 138/126; 138/141; 138/153; 138/172
[58] Field of Search ............... 138/126, 137, 141, 153, 138/172; 428/36

[56] References Cited

U.S. PATENT DOCUMENTS

| | | | |
|---|---|---|---|
| 3,945,867 | 3/1976 | Heller, Jr. et al. | 138/141 |
| 4,142,554 | 3/1979 | Washkewicz et al. | 138/141 |
| 4,196,464 | 4/1980 | Russell | 138/141 |
| 4,209,042 | 6/1980 | Baun | 138/141 |
| 4,238,260 | 12/1980 | Washkewicz | 138/153 |
| 4,261,390 | 4/1981 | Belofsky | 138/153 |

Primary Examiner—John E. Kittle
Assistant Examiner—James J. Seidleck
Attorney, Agent, or Firm—Cushman, Darby & Cushman

[57] ABSTRACT

A hydraulic brake hose has an inner tube made of nylon, an isocyanate adhesive layer formed on the outer surface of the inner tube, a chloroprene-rubber adhesive layer formed on the outer surface of the isocyanate adhesive layer, a reinforcing fiber layer made of high polymeric material selected from the group consisting of rayon, polyester, polyamid and polyvinyl alcohol, impregnated with resorcinol formaldehyde latex containing chloroprene-rubber and formed on the outer surface of the chloroprene-rubber adhesive layer and an outer tube made of chloroprene-rubber and formed on the outer surface of the reinforcing fiber layer. The inner tube has the modulus of elasticity of 7,000 to 15,000 kg/cm² and has an inner diameter of not less than 2.0 mm, an outer diameter of not more than 6.0 mm and a thickness of not less than 0.7 mm.

1 Claim, 4 Drawing Figures

HYDRAULIC BRAKE HOSE

BACKGROUND OF THE INVENTION

1. Field of the Invention

The present invention relates to a hydraulic brake hose used in a hydraulic brake system for use in a vehicle, especially a brake hose having a low expansibility suitable to a two-wheeled vehicle.

2. Description of the Prior Art

The conventional brake hose comprises an inner tube made of Teflon and a reinforcing layer made of stainless steel wire provided around the inner tube.

The inner tube made of Teflon has the low modulus of elasticity so as to be easily expanded by receiving oil pressure. In order to overcome the above defect of the inner tube and give the brake hose low expansibility and excellent pressure resistance, the reinforcing layer made of stainless steel wire is provided.

However, stainless steel wire has such a problem as to be inferior in fatigue resistance to bending force.

SUMMARY OF THE INVENTION

It is an object of the present invention to provide a brake hose having a layered structure composed of an inner tube, a fiber layer, and an outer tube, which exhibits low expansibility, excellent pressure resistance and fatigue resistance.

It is another object of the present invention to provide a bonding means for strongly bonding the fiber layer to the inner tube.

The brake hose of the present invention comprises an inner tube made of polyamid synthetic resin having the modulus of elasticity of 7,000 to 15,000 kg/cm$^2$, a fiber layer made of high polymeric material such as rayon and polyester having excellent fatigue resistance, and provided around the inner tube, and an outer tube made of rubber having excellent weather resistance and provided around the fiber layer. The inner tube, the fiber layer and the outer tube are bonded to one another by an adhesive.

According to the present invention, the inner diameter of the inner tube is set to not less than 2.0 mm in view of the flowing resistance within the inner tube and in accordance with the Japanese Industrial Standard(JIS).

The outer diameter thereof is set to not more than 6.0 mm in view of the low expansibility and the flexural rigidity thereof. In addition, the thickness of the inner tube is set to not less than 0.7 mm in view of the low expansibility, the strength and the producibility thereof.

On the outer surface of the inner tube are layered an isocyanate adhesive layer and a chloroprene-rubber layer in order to form two adhesive layers.

Then, on the chloroprene-rubber-layer is layered a fiber layer impregnated with chloroprene rubber resorcinol. formaldehyde latex adhesive to bond the fiber layer to the inner tube strongly.

DETAILED DESCRIPTION OF THE EMBODIMENT

Hereinafter, the present invention will be explained in detail in accordance with the embodiment and experiments thereof with reference to the accompanying drawings.

Figure 1:
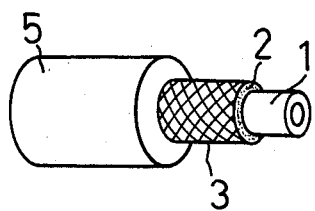
FIG. 1 is a partially cut away perspective view of one embodiment of a brake hose according to the present invention.

FIG. 1 illustrates a brake hose according to the present invention. In FIG. 1, around an inner tube 1 made of polyamid synthetic resin such as nylon-11 is wound reticulately a reinforcing fiber layer 3 made of high molecular material such as rayon, polyester, polyamide and polyvinyl alcohol.

The reinforcing fiber layer 3 is wrapped by an outer tube 5 made of chloroprene-rubber or the like. The inner tube 1, the reinforcing fiber layer 3 and the outer tube 5 are bonded to each other by an adhesive layer 2 strongly.

Various experiments of the brake hose of the present invention were performed. Samples were produced by the following method.

At first, to the outer peripheral surface of the inner tube 1 made of nylon-11 was applied isocyanate adhesive ( Chemlok 402 LORD FAR EAST INC. ) to the thickness of about 20$\mu$. Then, to the isocyanate adhesive layer was applied chloroprene-rubber dissolved by an organic solvent to the thickness of about 40$\mu$. Thereafter, the applied chloroprene-rubber was dried.

Rayon fiber impregnated with resorcinol formaldehyde latex(adhesive formed by combining a condensate of resorcinol and formalin with chloroprene-rubber latex, hereinafter will be called RFL) are wound around the chloroprene-rubber layer reticulately. Then, the outer tube made of chloroprenerubber is formed around the inner tube around which the rayon fibers are wound, by an extrusion process.

As a result, a hose composed of the inner tube 1 made of polyamid synthetic resin(nylon-11), the adhesive layer 2 consisting of the isocyanate adhesive layer 2a and the chloroprene-rubber layer 2b, the reinforcing fiber layer 3 made of rayon fiber impregnated with RFL 4 and the outer tube 5 made of chloroprene-rubber, was obtained.

Next, the peeling test of the obtained hose was performed in accordance with JIS K 6301.

For comparison, another hose formed by applying Chemlok 402 to the outer surface of the inner tube made of nylon-11 by the same method as described above and directly winding the rayon fiber impregnated with RFL around the Chemlok 402 -applied inner tube without applying chroroprene-rubber, was prepared and the peeling test was performed.

The experimental results were that the peeling load of the fiber layer of the hose of the present invention was 2.5 to 4.5 kg/cm while that of the hose prepared for comparison was 1.0 to 2.0 kg/cm.

It is well known that isocyanate adhesive has a property of strongly adhering to polyamid resin and chloroprene-rubber.

According to the present invention, the isocyanate adhesive layer is formed on the outer surface of the inner tube made of polyamid synthetic resin and the fiber layer impregnated with RFL including chloroprene-rubber is bonded to the formed isocyanate adhesive layer through the chloroprene-rubber layer. Thus, the inner tube, chloroprene-rubber layer and the fiber layer are strongly bonded to one another.

Figure 3:
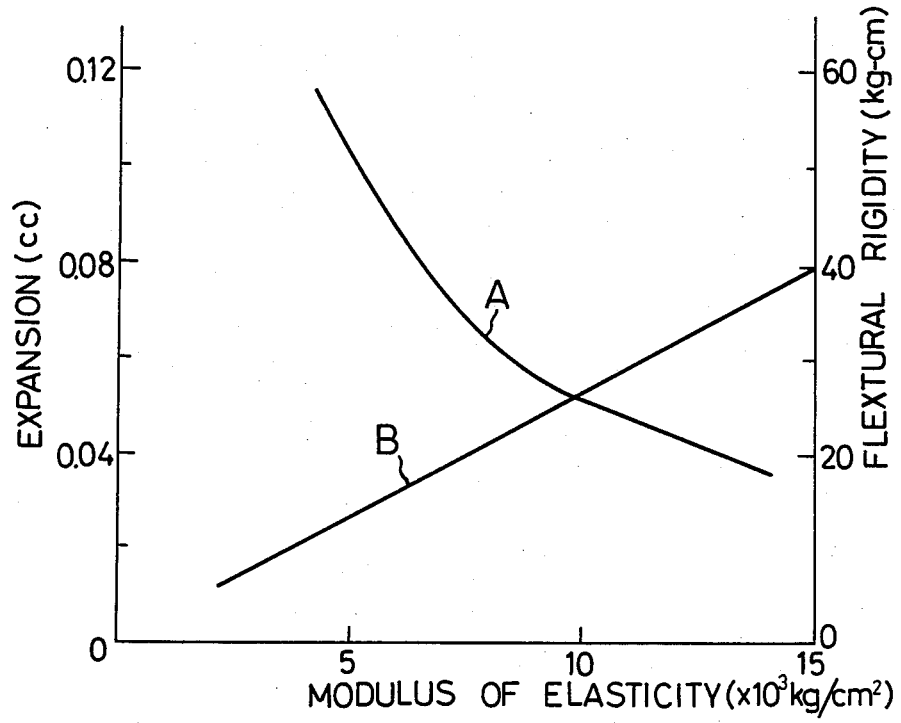
FIGS. 3 and 4 are views showing the experimental results on the properties of the brake hose according to the present invention.

Next, the relation between the expansion and the flexural rigidity in case that the modulas of elasticity of the inner tube 1 made of nylon is variously changed, is shown in FIG. 3. In this case, the inner diameter of the inner tube 1 was set to 3 mm and the outer diameter thereof was set to 5 mm. Accordingly, the thickness thereof was 1 mm.

In FIG. 3, the line A shows the expansion while the line B shows the flexural rigidity. The expansion means the volumetric expansion of the hose having a free length of 305 mm under an inner pressure of 50 kg/cm$^2$.

Figure 2:
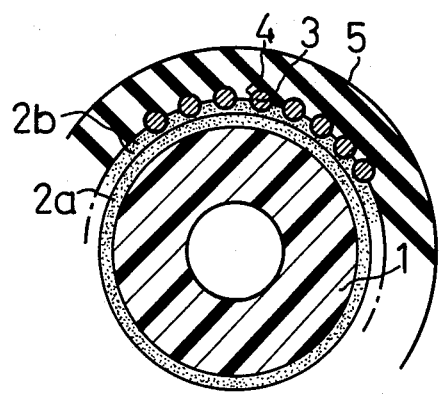
FIG. 2 is an enlarged sectional view of the brake hose of FIG. 1.

The brake hose for use in a two-wheeled vehicle, which is requried to have low expansibility, is desired to have the expansion of about 40 kg-cm or less. Therefore, as is apparent from FIG. 2, the proper range of the modulus of elasticity of the inner tube 1 is 7,000 to 15,000 kg/cm$^2$.

It was experimentally confirmed that the modulus of elasticity of each of the reinforcing fiber layer 2 and the outer tube 3 of the brake hose having the above described structure was extremely small as compared with the inner tube 1 so that the modulus of elasticity of the whole hose was substantially equal to that of the inner tube 1.

Figure 4:
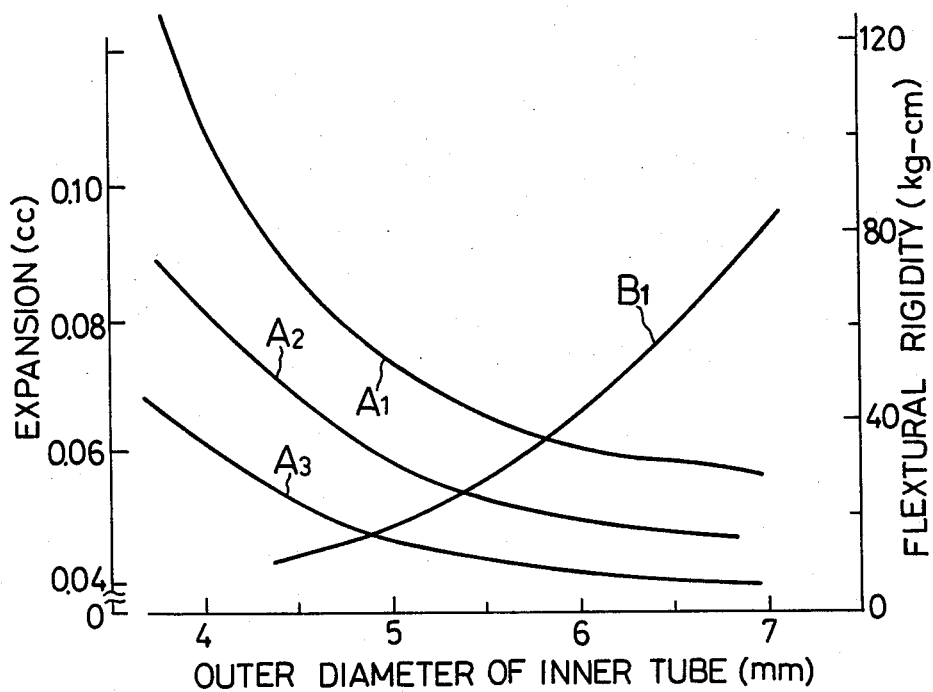

FIG. 4 shows the relation between the expansion and the flexural rigidity in the case that the inner diameter and the outer diameter of the inner tube 1 is variously changed. In this case, the inner tube 1 is made of nylon having the modulus of elasticity of 7,000 kg/cm$^2$.

The lines $A_1$, $A_2$ and $A_3$ show the variations of the expansion in the hoses having an inner diameter of 3.0 mm, 2.8 mm and 2.6 mm, respectively.

The line $B_1$ shows the variation of the flexural rigidity. The flexural rigidity is scarcely influenced by the difference in inner diameter of the inner tube 1 and is determined by only the outer diameter thereof.

It is clear from FIG. 4 that the outer diameter of the inner tube 1 should be set to 6.0 mm or less in order to keep the expansion of the hose to not more than 0.08 cc and the flexural rigidity thereof to not more than 40 kg-cm.

The inner diameter of the inner tube of the brake hose is prescribed in JIS to not less than 2.0 mm in view of the flowing resistance or the like within the inner tube. And it is preferable to set the thickness of the inner tube to not less than 0.7 mm to prevent the inner tube from being damaged by stones or the like from a road.

From the inventors' experiments it was confirmed that when the inner tube having a thickness of more than 0.7 mm is used, a mandrel must be inserted in the inner tube in order not to be crushed by high tension force applied to the outer periphery thereof in the reinforcing fiber layer forming step. As a result, the producing steps become complex. Therefore, the inner tube must have a thickness of not less than 0.7 mm.

In FIG. 4, when the thickness of the inner tube having an inner diameter of 3.0 mm(line $A_1$)is set to 0.7 mm, the outer diameter thereof becomes 4.4 mm. In this case, the expansion is a little under 0.09 cc and the flexural rigidity is 10 kg-cm. This inner tube $A_1$ exhibits excellent flexibility but is a little inferior in low expansibility.

As the thickness of the inner tube $A_1$ is increased, namely the outer diameter thereof is increased, the expansion thereof is decreased to 0.08 cc or less.

When the thickness of the inner tube having an inner diameter of 2.8 mm(line $A_2$) is set to 0.7 mm, the outer diameter thereof becomes 4.2 mm. In this case, the expansion is a little under 0.08 cc. Therefore, the inner tube $A_2$ exhibits excellent low expansibility. The expansion of the inner tube $A_2$ is decreased further as the thickness thereof is increased.

In the experiments shown in FIG. 4, nylon-11 having the modulus of elasticity of 7,000 kg/cm$^2$ was used as the material of the inner tube. If the material having the modulus of elasticity of not less than 7,000 kg/cm$^2$, the flexural rigidity of the inner tube is increased. In this case, the outer diameter of the inner tube must be set to less than 6 mm in view of the increase of flexural rigidity thereof.

Next, the fatigue test prescribed in JIS D2601 was performed. The test result shows that the hose according to the present invention(inner tube:made of nylon-11 having the modulus of elasticity of 10,000 kg/cm$^2$, having an inner diameter of 3.0 mm and an outer diameter of 5.0 mm, reinforcing tube:made of rayon fiber, outer tube:made of chloroprene-rubber) exhibits fatigue resistance of about five times as large as that of the conventional brake hose which is on the market (inner tube:made of Teflon, reinforcing tube:made of stainless steel wire).

As described above, according to the present invention, in order to improve the low fatigue resistance of the conventional reinforcing layer made of metallic wire, the reinforcing layer is formed of the fiber layer made of high polymeric material such as rayon, polyester, polyamid and polyvinyl alcohol instead of the metallic reinforcing layer. And according to the present invention, the expansibility of the hose can be made low by selecting the proper physical properties of the inner tube. Namely, by properly combining the modulus of elasticity, the outer diameter, the inner diameter and the thickness of the inner tube made of polyamid synthetic resin, a hydraulic brake hose having low expansibility, excellent flexibility and durability can be obtained.

What is claimed is:

1. A hydraulic brake hose comprising:
an inner tube made of polyamid synthetic resin;
an adhesive layer formed on the outer surface of said inner tube;
a reinforcing fiber layer made of fiber of high polymeric material and formed on the outer surface of said adhesive layer;
an outer tube made of rubber and formed on the outer surface of said reinforcing fiber layer; said inner tube having the modulus of elasticity of 7,000 to 15,000 kg/cm$^2$ and having an inner diameter of not less than 2.0 mm, an outer diameter of not more than 6.0 mm and a thickness of not less than 0.7 mm,
wherein the polyamid resin for making said inner tube is nylon, the high polymeric material for making said reinforcing fiber layer is selected from the group consisting of rayon, polyester, polyamid and polyvinyl alcohol, and the rubber for making said outer tube is chloroprene-rubber, and
wherein said adhesive layer is composed of an isocyanate adhesive layer formed on the outer surface of said inner tube and a chloroprene-rubber adhesive layer formed on the outer surface of said isocyanate adhesive layer, and the fiber for forming said reinforcing fiber layer is impregnated with resorcinol formaldehyde latex containing chloroprene-rubber.

* * * * *